Aug. 5, 1941.  J. H. WILSON  2,251,862
FRICTION CLUTCH
Filed Aug. 1, 1938  3 Sheets-Sheet 3
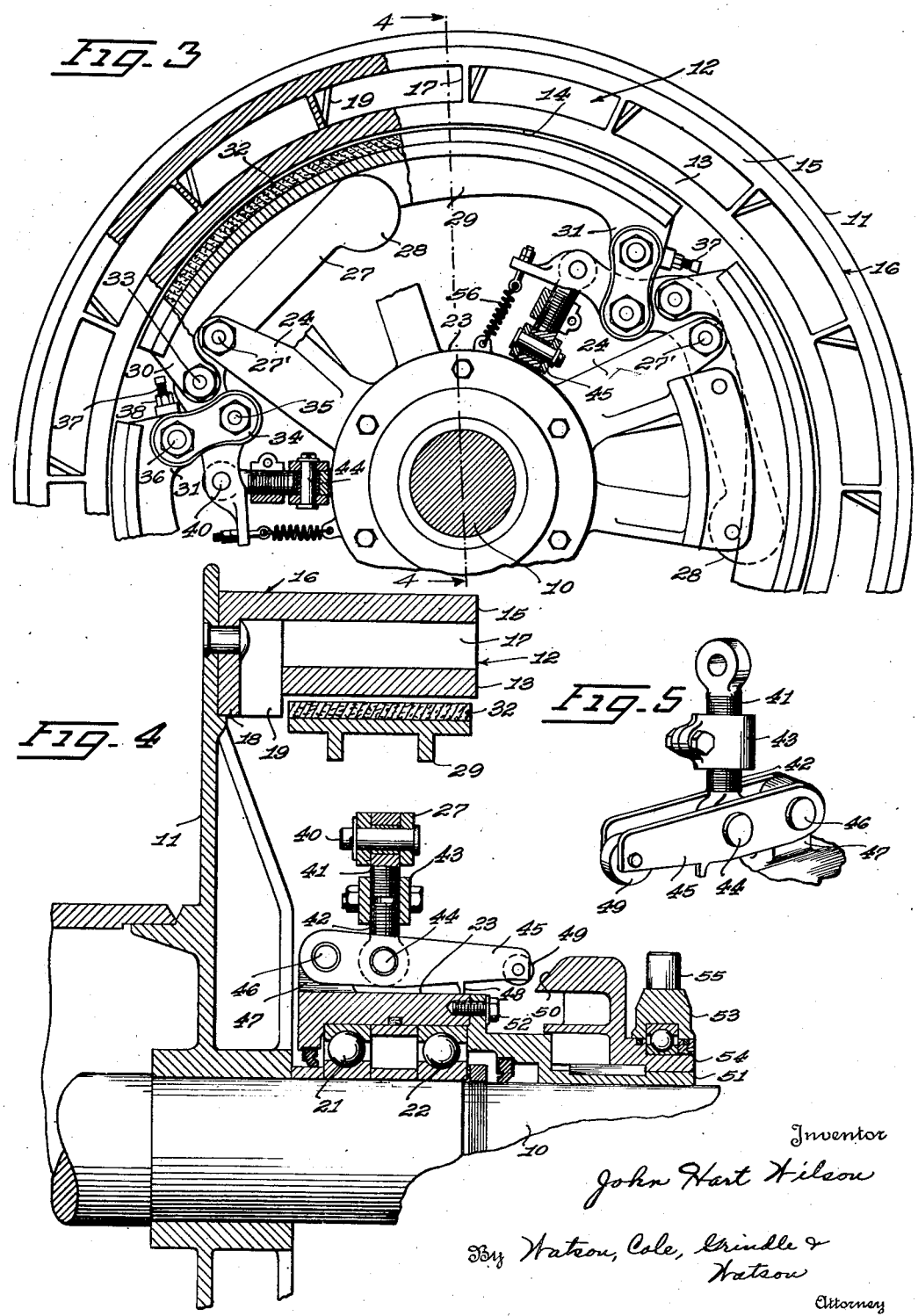

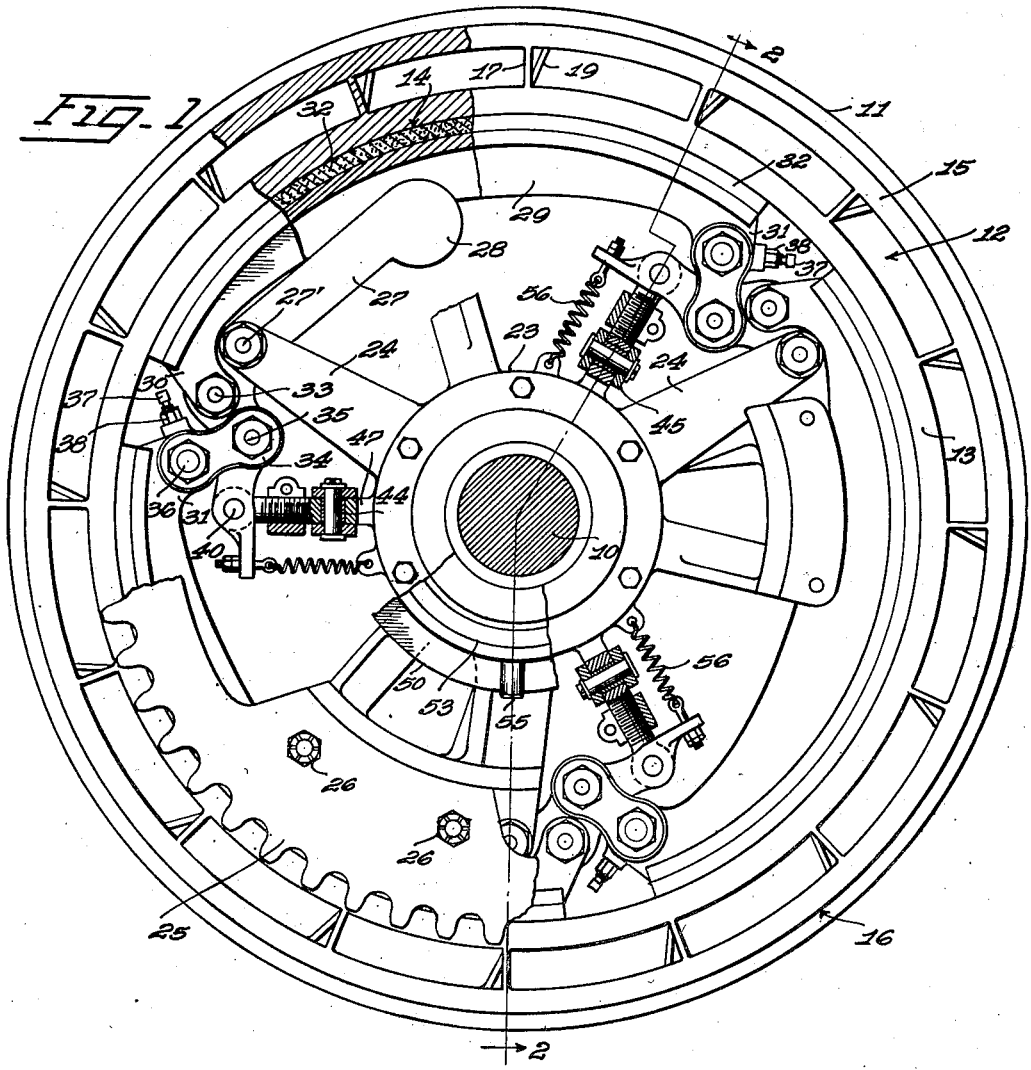

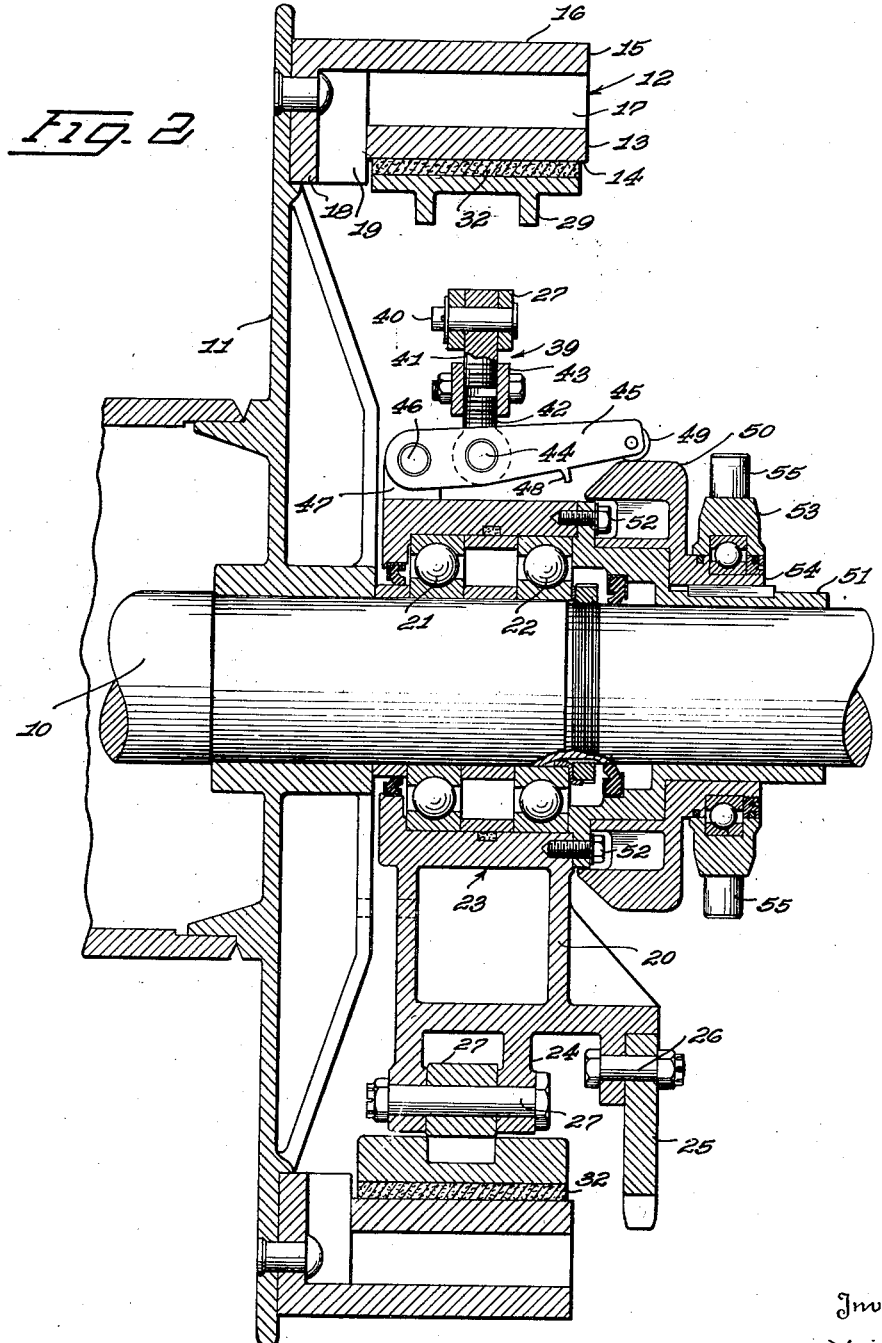

Patented Aug. 5, 1941

2,251,862

UNITED STATES PATENT OFFICE 2,251,862

FRICTION CLUTCH

John Hart Wilson, Wichita Falls, Tex.

Application August 1, 1938, Serial No. 222,514

9 Claims. (Cl. 192—75)

This invention relates to friction clutches and more particularly to the type of mechanism known as an internal expanding clutch.

A principal object of the present invention is the provision of internal expanding clutch mechanism adapted for use with heavy machinery, for example oil well machinery, an important feature residing in the provision of a clutch which is self-energized and capable of transmitting very great power without slippage.

Another object is the provision of a self-energizing clutch of great power which at the same time is easily disengaged under load.

Another object is the provision of a clutch of the type mentioned, in which the several clutch shoes or friction elements are simultaneously engaged with the cooperating clutch member over their entire surfaces.

A further object is the provision of a clutch mechanism such as described, in which the friction elements are adjustably connected to the operating mechanism so as to enable compensation for wear to be made and likewise enable proper initial adjustment to be made, and in which the throw of the operating mechanism is likewise adjustable for the same purpose.

Another object of the present invention is the provision of a clutch of the internal expanding type in which the driven member is provided with a brake surface adjacent its clutch surface, and is also provided with means for inducing a circulation of air over and around the brake and clutch surfaces for cooling purposes.

A further object is the provision of a clutch of the type described, in which the driving member is journalled on the shaft of the driven member and is provided with a toothed portion or its equivalent, enabling it to be driven from a remote shaft or power source by means of a chain or the equivalent.

Another object of the present invention is the provision of a clutch of the internal expanding type, in which the operating mechanism includes pneumatic means for moving the friction elements of the driving member into engagement with the clutch surface of the driven member.

Other and further objects, features and advantages of the present invention will be more apparent from the following specification taken in connection with the accompanying drawings in which Figure 1 is an elevation of a clutch mechanism according to the present invention, looking in the direction of its axis, with parts broken away to facilitate illustration, the clutch being shown as engaged;

Figure 2 is a section on line 2—2 of Figure 1;

Figure 3 is a fragmentary view similar to Figure 1, showing the clutch in the disengaged position;

Figure 4 is a vertical section on line 4—4 of Figure 3;

Figure 5 is an enlarged detail, in perspective, of one of the cam levers and its associated compression member; and Figure 6 is an enlarged fragmentary perspective illustrating the connection of one end of a clutch shoe or friction element to its operating lever.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2, the numeral 10 designates a shaft on which a driven member 11 is secured. The latter may, for example, comprise a pulley, drum, or other desired driven member, and is provided with a cylindrical portion 12, which may be formed integrally therewith, or secured thereto in a suitable manner. The cylindrical portion 12 comprises an inner member 13 having an internal clutch surface 14, and an outer member 15 provided with a braking surface 16, the members 13 and 15 being connected by spaced webs 17. An inwardly extending flange 18 of the cylindrical portion 12 is provided with spaced inclined vanes 19, for a purpose to be described hereinafter.

A driving member 20 is suitably journalled on the shaft 10, for example by means of anti-friction bearings 21 and 22, and comprises a hub portion 23 having a plurality of radial arms 24. The driving member 20 is also provided with a toothed portion 25 which may be formed integrally therewith or suitably secured thereto as by means of bolts 26, and is adapted to be driven from a remote shaft (not shown) or other power source by means of a chain meshing with the toothed portion 25.

An operating lever 27 is pivoted as at 27' at the extremity of each radial arm 24, the operating levers 27 being formed with weighted ends 28 for a purpose to be hereinafter described. In the present case, three radial arms 24 and operating levers 27 are shown. The friction elements or clutch shoes 29 are three in number, and are connected between adjacent operating levers 27. Each friction element 29 is provided at its trailing end with a pair of inwardly extending ears 30 and at its leading end with a similar pair of ears 31. In the present description, the direction of rotation of the driving element is assumed to be clockwise in Figure 1, and hence the clockwise end of each brake shoe is designated the leading end, and the counterclockwise end as the trailing end. The several brake shoes are preferably provided with suitable friction surfaces 32.

The trailing end of each friction element 29 is pivotally connected to the adjacent operating lever 27 by means of a pin or bolt extending through the ears 30 and the lever 27 as at 33, while the leading end of the next friction element is connected to the same lever 27 through a link 34, which is pivoted to the lever 27 as at 35 and has a pivotal connection with the ears 31 of the friction element, as at 36. The pivot 36 is of the eccentric type and may be adjusted by rotation so as to lengthen or shorten the connection between the link 34 and its associated friction element 29, a set screw 37 and lock nut 38 being provided for locking the pivot 36 in the position to which it is adjusted.

A compression member 39 is pivoted to each operating lever 27 as at 40, and comprises two oppositely threaded portions 41 and 42 connected by an oppositely threaded split nut 43. The inner thread portion 42 of the compression member 39 is pivoted as at 44 to a cam lever 45, which in turn is pivoted at 46 to a radially extending ear 47 formed on the hub 23. By reason of the described construction, it is apparent that the length of the compression member 39 may be adjusted as desired.

Each cam lever 45 is provided with an inwardly projecting stop 48 and carries at its end opposite the pivot 46 a cam roller 49, for cooperation with an inclined annular cam 50. The latter is splined to a sleeve 51 which rotates with the hub 23, being bolted thereto as at 52. The cam 50 may be shifted axially of the shaft 10, to engage and disengage the clutch, by means of a shifter yoke 53 journalled on an annular flange 54 of the cam 50, the yoke 53 being provided with suitable trunnions 55 for engagement with a manually operated lever, not shown.

An important feature of the present invention resides in the connections between each operating lever 27 and the adjacent ends of its associated friction elements 29. Thus, since the trailing end of each friction element 29 is directly pivoted to the operating lever 27, which is in turn pivoted at 27', it will be apparent that in moving from engaged to disengaged position, and vice versa, the trailing end of the friction element moves in a path which is approximately radial of the clutch mechanism or in other words, normal to the clutch surface 14. On the other hand, by virtue of its connection to the operating lever through the link 34, the leading end of each friction element, in moving between engaged and disengaged positions, travels in a path making an acute angle with the friction surface 14, or in other words, moves rearwardly with respect to that surface in going to engaged position. By virtue of this fact, the clutch is self-energized (i. e., will remain engaged under load without the application of force for that purpose) and has great power, while at the same time it may be easily disengaged under load, the necessary force for disengaging the clutch being provided by the weighted ends 28 of the operating levers 27 which, due to centrifugal force, tend to move outwardly, rocking the operating levers into disengaged position. Preferably, the opposite extremity of each operating lever is connected to the hub 23 by a spring 56, to assist the disengagement of the clutch at low speeds.

A mathematical analysis of the present mechanism will demonstrate that the angle which the path of the leading end of the friction element makes with the friction surface 14 depends upon the relative length of the friction element, assuming the trailing end to move radially. The shorter the friction element, the more nearly radially its leading end will move, and the longer the friction element, the more nearly tangentially its leading end will move. In the present case since each friction element is nearly 120° in length, the angle between the path of its leading end and the friction surface 14 is quite acute, being in the neighborhood of 20°, and the clutch mechanism is therefore self-energizing to a high degree.

By virtue of the adjustable connections between the cam levers and the operating levers and the adjustable pivotal connections between the links 34 and friction elements 29, it will be seen that provision is made for accurate initial adjustment as well as for adjustment from time to time to equalize the pressure upon the several friction elements and to compensate for wear, all for the purpose of insuring simultaneous engagement of the friction elements over their entire surfaces.

When the clutch is engaged and the driven member 11 is rotating, a constant current of air is caused to pass between the inner member 13 and outer member 15 of the cylindrical portion 12, by reason of the inclined vanes 19, thus cooling the braking surface 16 and clutch surface 14.

Having thus described the invention, what is claimed as new and desired to be secured by Letters Patent is:

1. In a clutch mechanism, a driving member, a driven member having a cylindrical portion provided with an internal clutch surface, and means carried by said driving member for operatively connecting said driving and driven members, said means comprising a plurality of radial arms, levers pivoted on said arms, a plurality of friction elements each having its respective ends connected to adjacent levers, means normally maintaining said levers in inoperative position, whereby said friction elements are spaced from said clutch surface of said driven member, and means for simultaneously rocking said levers to move said friction elements into engagement with said clutch surface, the connections between said friction elements and said levers being such that both ends of said friction elements are simultaneously engaged with said driven member, the leading ends of said friction elements moving in paths making a relatively acute angle with said clutch surface and the trailing ends of said friction elements moving approximately radially.

2. The combination of claim 1, said leading ends of said friction elements being connected to said respective levers by links, and said trailing ends being directly pivoted to said levers.

3. The combination of claim 1, said leading ends of said friction elements being connected to said respective levers by links, and said trailing ends being directly pivoted to said levers, said links having adjustable pivotal connections with said friction elements.

4. In a clutch mechanism, a driving member, a driven member having a cylindrical portion provided with an internal clutch surface, and means carried by said driving member for operatively connecting said driving and driven members, said means comprising a plurality of radial arms, levers pivoted on said arms, a plurality of friction elements each having one end directly pivoted on one of said levers and its other end connected to another of said levers by means of a link, means for simultaneously rocking said levers to move said friction elements into engagement with said clutch surface, and means normally maintaining said levers in inoperative position, said last means comprising centrifugal elements and resilient elements.

5. In a clutch mechanism, a driving member, a driven member having a cylindrical portion provided with an internal clutch surface, and means carried by said driving member for operatively connecting said driving and driven members, said means comprising a plurality of radial arms, levers pivoted on said arms, a plurality of friction elements each having one end directly pivoted on one of said levers and its other end connected to another of said levers by means of a link, means for simultaneously rocking said levers to move said friction elements into engagement with said clutch surface, and means normally maintaining said levers in inoperative position, said last means comprising centrifugal elements and resilient elements, and said means for rocking said levers comprising cam followers associated with said respective levers and arranged radially inward thereof, and a movable cam for acting upon said cam followers simultaneously.

6. In a clutch mechanism, a driving member, a driven member having a cylindrical portion provided with an internal clutch surface, and means carried by said driving member for operatively connecting said driving and driven members, said means comprising a plurality of radial arms, levers pivoted on said arms, a plurality of friction elements each having its respective ends connected to adjacent levers, means normally maintaining said levers in inoperative position, whereby said friction elements are spaced from said clutch surface of said driven member, and means for simultaneously rocking said levers to move said friction elements into engagement with said clutch surface, said last means comprising compression members associated with said respective levers and extending radially inward therefrom, cam levers pivotally supported on the inner ends of said compression members, cam followers carried by said cam levers, and a movable cam for acting upon said cam followers simultaneously.

7. The combination of claim 6, said compression members being adjustable in length.

8. In a clutch mechanism, a driving member, a driven member having a cylindrical portion provided with an internal clutch surface, and means carried by said driving member for operatively connecting said driving and driven members, said means comprising a plurality of radial arms, levers pivoted on said arms, a plurality of friction elements each having its respective ends connected to adjacent levers, means normally maintaining said levers in inoperative position, whereby said friction elements are spaced from said clutch surface of said driven member, and means for simultaneously rocking said levers to move said friction elements into engagement with said clutch surface, said driven member having a brake drum rigidly secured thereto and spaced outwardly of said cylindrical portion, and means for causing circulation of air between said brake drum and said cylindrical portion during rotation of said driven member.

9. In a clutch mechanism, a driving member, a driven member having a cylindrical portion provided with an internal clutch surface, and means carried by said driving member for operatively connecting said driving and driven members, said means comprising a plurality of radial arms, levers pivoted on said arms, a plurality of friction elements each having its respective ends connected to adjacent levers, means normally maintaining said levers in inoperative position, whereby said friction elements are spaced from said clutch surface of said driven member, means for simultaneously rocking said levers to move said friction elements into engagement with said clutch surface, said driven member having a brake drum rigidly secured thereto and spaced outwardly of said cylindrical portion, and means for causing circulation of air between said brake drum and said cylindrical portion during rotation of said driven member, said last means comprising a plurality of spaced inclined vanes carried by said driven member.

JOHN HART WILSON.